Aug. 26, 1969    J. SCHMIDT    3,462,911
APPARATUS FOR FORMING PELLETS OF SEMI-SOLID MATERIAL
Original Filed June 9, 1966    5 Sheets-Sheet 1

INVENTOR:
JOHN SCHMIDT
By Norman Gerlach

INVENTOR.
JOHN SCHMIDT

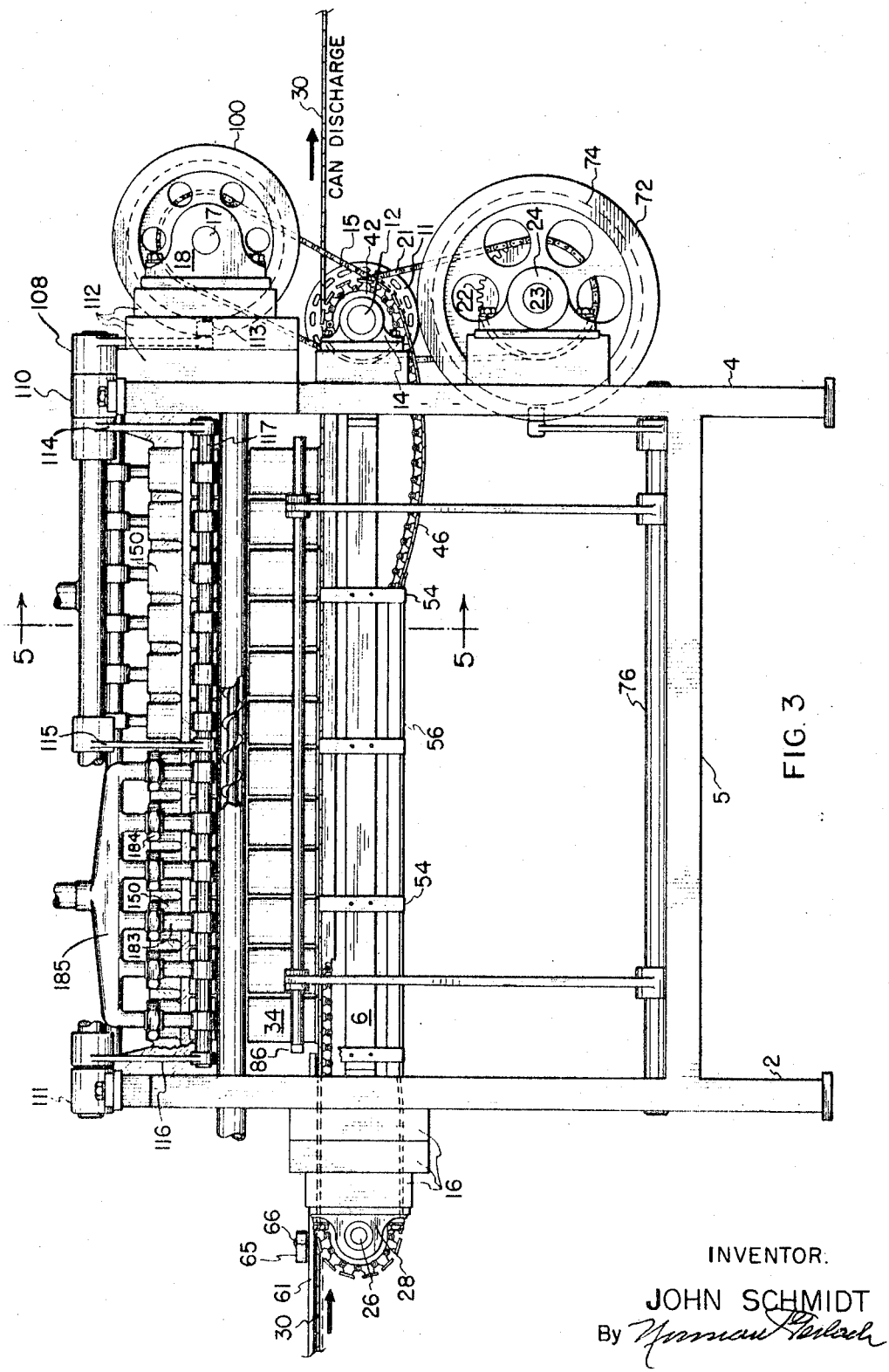

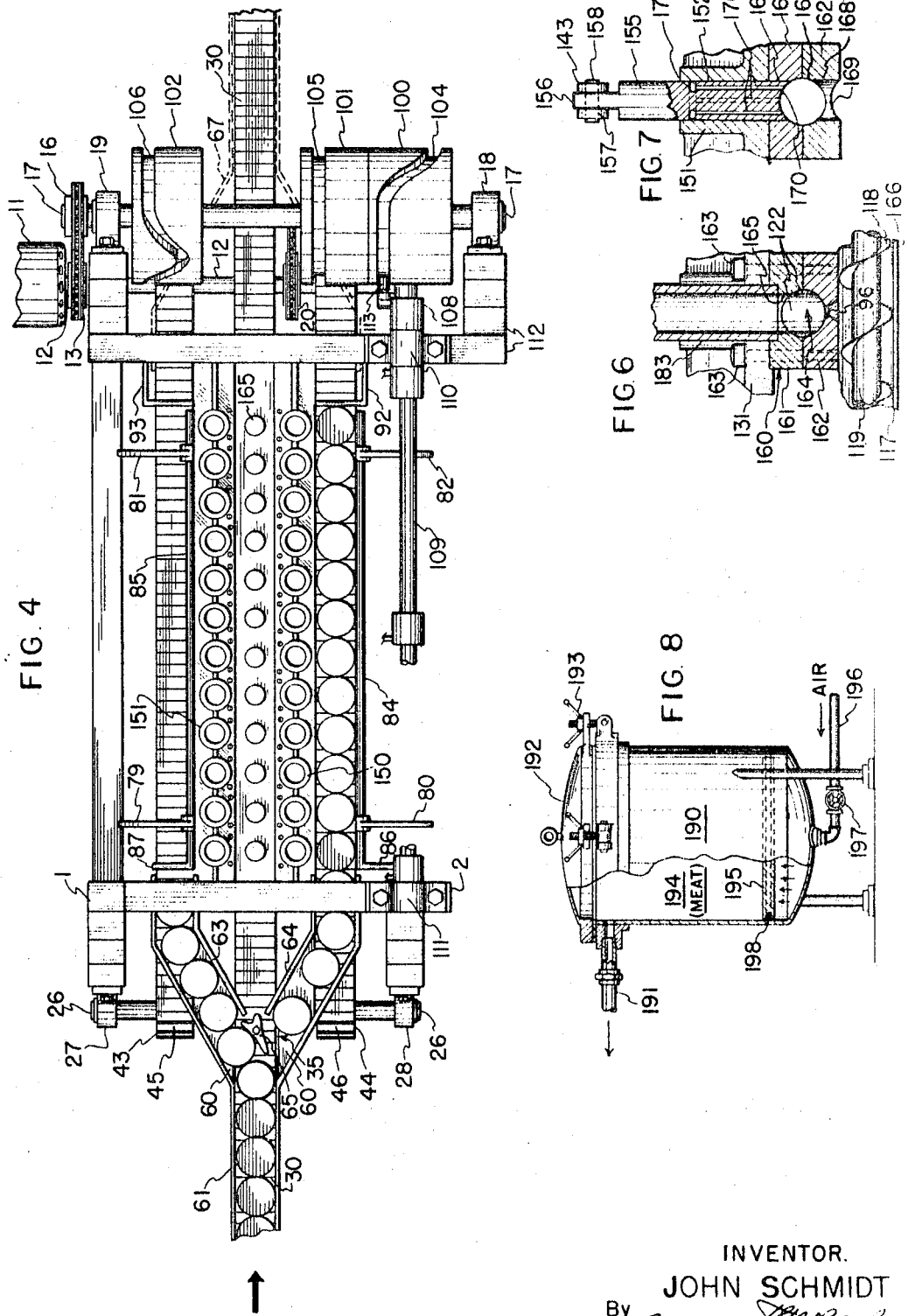

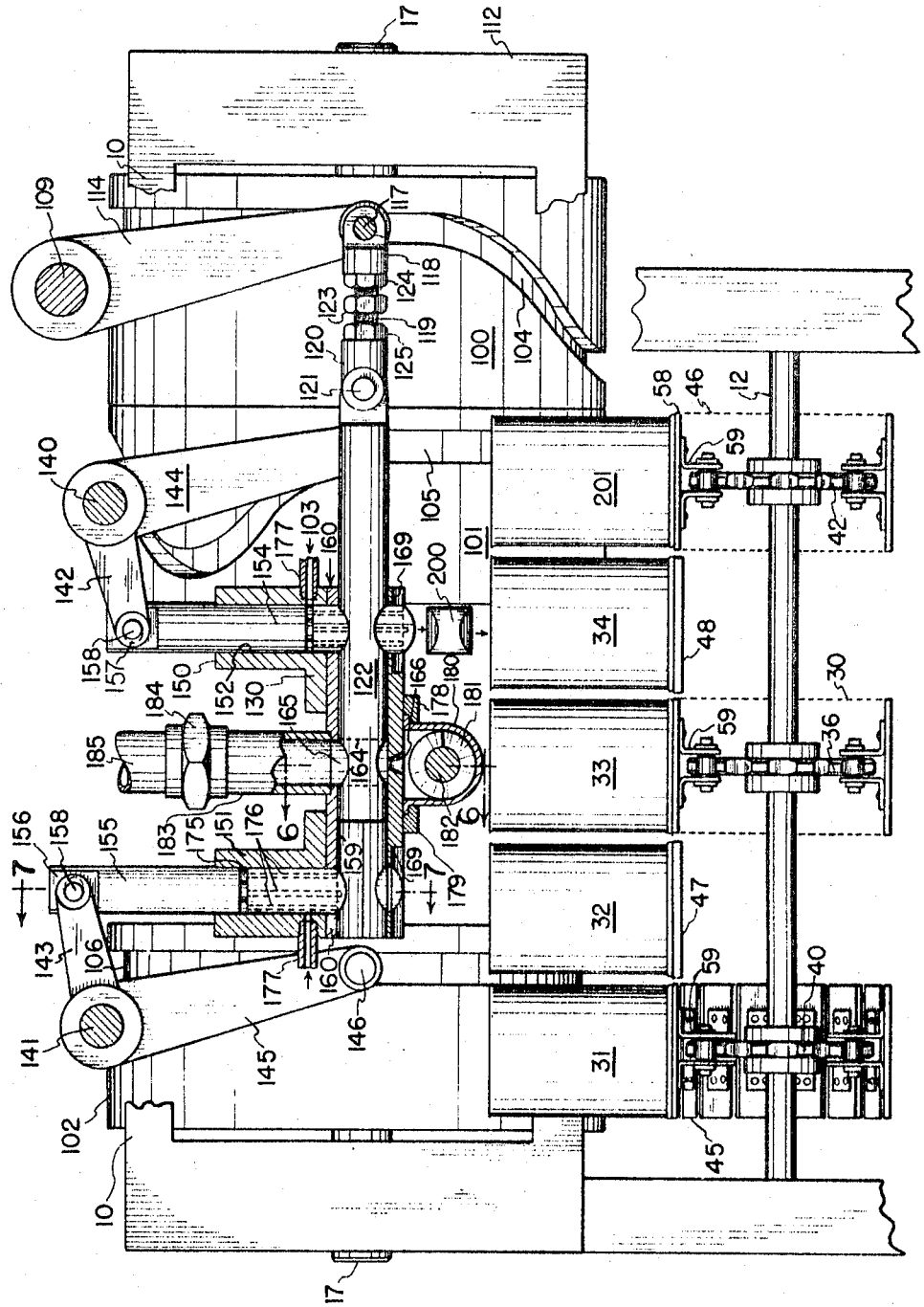

United States Patent Office 3,462,911
Patented Aug. 26, 1969

3,462,911
APPARATUS FOR FORMING PELLETS OF SEMI-SOLID MATERIAL
John Schmidt, 322 N. Greenwood Ave.,
Jenkintown, Pa. 19046
Continuation of application Ser. No. 556,433, June 9, 1966. This application July 10, 1968, Ser. No. 761,366
Int. Cl. B65b 25/06, 63/02; A22c 7/00
U.S. Cl. 53—122                                   20 Claims

ABSTRACT OF THE DISCLOSURE

An apparatus adapted to form pellets of semi-solid material and deposit them into containers and comprising a source of pressurized semi-solid material, mold means connected to the discharge end of the conduit and adapted successively to receive charges of the material in one position of the mold means and to shape said charges into pellets during movement of said mold means in another position, means for ejecting the pellets sequentially from the mold means in said another position of the latter for gravity drop to a filling position beneath said mold means, and means for conveying containers to the filling position in timed relation to ejection of the pellets for reception of the latter in the receptacles.

---

This application for original U.S. Letters Patent is a continuation of my abandoned co-pending application Ser. No. 556,433, filed on June 9, 1966 and entitled "Apparatus for Forming Pellets of Semisolid Material."

The present invention relates to an apparatus which is designed automatically to form and feed meat balls or similar comestibles of semi-solid character into open-top containers, i.e., cans, and is characterized by high speed of operation, sterility, avoidance of waste, automatic and trouble-free operation and uniformity of product. More particularly, this invention relates to an automatic apparatus for forming pellets of semi-solid materials, such, for example, as meat and dough, and packaging them in metal containers, such apparatus being so designed that the pellets are formed, ejected and dropped into the metal containers in multiples, and the metal containers are oriented, moved into filling position in multiples, and then moved on in a timed sequence under automatic control and without the necessity of hand operations. The particular apparatus of this invention represents certain improvements over the apparatus of said co-pending application and is constructed or designed to effect elimination of parts and functions and to obtain over-all smoothness of operation.

It has been the practice in the art to form such semi-solid food products as meat balls by extrusion and cutting steps, followed by rolling the resulting cylindrical pieces of ground meat into more or less spherical shapes. One rolling means that has heretofore been used comprises two juxtaposed endless belts which are arranged to operate in a spaced relationship and between which the cylinders of meat are rolled into balls by the slight transverse motion of one belt with respect to the other belt. Other types of rolling means are provided in the prior art. After reshaping of the cylindrical food pieces into spheres, the pieces are conveyed by belt or other means to a can filling machine or are picked up by hand and placed in cans. These rolling, conveying and handling steps result in a substantial percentage of breakage of the spherical food pieces and adverse effects upon the other food pieces as a result of contact with the broken particles which inevitably form. Losses in the order of 25% or more are sometimes encountered and such losses ordinarily require reprocessing of the broken or non-uniform balls or pellets.

The primary object of this invention is to provide an apparatus which eliminates or mitigates the foregoing difficulties by forming and ejecting balls or pellets of semi-solid food material directly into the containers in which they are to be packaged to the end that the final food products are uniform in all respects and handling costs are thus eliminated.

Another object of this invention is to provide an apparatus in which the containers, such as cans, are delivered in multiples in close adjacent position or rows in order to receive the freshly formed and ejected spheres of semi-solid food material, and the filled containers are removed in multiples or rows therefrom to the end that the speed and efficiency of the entire operation are materially or appreciably increased.

Still another object of this invention is to provide a pallet forming apparatus wherein the amorphorous semi-solid food material is fed under pressure alternately into two transverse apertures of a reciprocating plunger, and ejector plungers are provided to eject and further compact each pellet while forcing the same to drop by gravity a short distance into the open top of a subjacent container or can. The apparatus of this invention features two parallel but spaced apart can inlet conveyor belts, a central can carrying and discharging conveyor belt between and spaced from the inlet conveyor belts, stationary filling platforms between said inlet belts and said central can carrying and discharging belt, means for alternatively directing cans from the front carrying portion of said central belt onto the inlet or side belts from each of the side belts onto the adjacent stationary filling platform, means for forming and discharging a plurality of pellets or semisolid food material alternately into the cans on said-stationary platforms, and means for alternately moving the next completed rows of incoming cans on the side belts laterally against the rows of cans on the stationary, filling platforms in order alternately to move the last mentioned rows onto the central conveyor belt after they have been filled with pellets, said central belt serving to discharge the filled or completed cans from the rear portion of the apparatus. The apparatus of this invention also features a manifold to supply semi-solid food material under pressure to a plurality of tubular die channels through a central inlet port in each, the die channels having spaced ejection plunger ports and discharge ports aligned therewith, and double chambered pistons reciprocable within said die channels and operable in connection with reciprocation to receive the semi-solid food material in one position thereof and to discharge the same in the form of pellets in their other position.

A further object of the present invention is the provision of fully automatic formation and packing of pellets of semi-solid food material, delivery of the cans to be filled to filling position, deposition of pellets in the cans when the latter reach their filling position, and removal of the cans from such filling position after pellets or balls in predetermined number have been deposited into each can to the end that not only is the formation and packing of the pellets or balls of semi-solid food material automatic but also the count of the pellets or balls is likewise automatic.

Another object of the present invention is to make the balls or pellets more uniform in size, weight and shape than has heretofore been possible.

With the above and other objects in view, the present invention includes certain automatic molding means whereby a material such as ground meat is formed into pellets, such automatic molding means having two sets of cylindrical or otherwise curved surfaces whose axes are at a right angle to each other to the end that each formed or resultant pellet will have a shape closely resemblying a ball, and while not a true sphere yet sufficiently like a ball to be acceptable as a "meat-ball" in common parlance.

The present invention further includes a multi-cavity, movable, mold plunger assembly whose several cavities alternately move into and out of alignment with a supply of semi-solid food material under pressure for the purpose of alternately filling the cavities, it being contemplated that the cavities thereafter (in a different phase) move into and out of operative alignment with a plurality of pellet ejector means at the can-filling position in order that the pellets are sequentially pushed out of the mold cavities of said mold plunger assembly and drop directly into the cans therebeneath. In the preferred embodiment of this invention, there are separate can-filling positions for said pellet ejectors, and means are provided for the recovery of excess material from the mold cavities at the instant of the formation of the pellets or the balls.

The present invention further includes means for providing a fluid under pressure at the interfaces between the ejectors and molded pellets at the instant of or immediately before release of the pellets from the cavities in the mold plunger assembly, and means for intermittently and alternately moving the cans to be filled beneath the pellet ejectors in timed relation to the movement of the ejectors and also moving the filled cans out of their filling positions onto a conveyor belt which is between the several filling positions and receives the filled cans from each filling position, such can movement being at right angles to the direction of motion of the conveyor belt and being generally parallel to the plane that is common to the several meat-ball ejectors of the apparatus.

The present invention also features the timing of the aforementioned movements of cans in relation to movements of the mold-plunger assembly and of the pellet-ejectors to the end that each can will remain "resident" in filling position or station for a length of time sufficient to correspond to any pre-selected number of meat-ball deliveries by the ejector above it, as, for instance, for four, five or six operations of the associated meat-ball ejector whereby the count of the meat balls per can is automatically achieved.

The present invention further includes the ganging of several, for example, five, eight, ten, fifteen of the pellet forming and ejecting means in parallel relation to each other and spaced from each other a distance sufficient to accommodate the diameters of the cans to be filled, and a corresponding ganging of can-filling positions and can-moving means operating parallel to the planes common to the mold cavities in each mold plunger, together with can-supply belts or conveyors at a right angle to the direction of movement of such can-moving means and parallel to each row of can-filling positions, whereby five, eight, ten or fifteen (more or less) cans are filled simultaneously during one-half of the cycle of the meat-ball molding and forming means and a like number of cans are filled during the other half of such cycle; while the so alternately filled sets or rows of (five, eight, ten or fifteen) cans are being moved to the same discharge conveyor in opposite phases of such cycle.

In the accompanying five sheets of drawings in which like reference numerals indicate like parts:

FIG. 3 is a side view of the apparatus with parts of the ejection and plunger arrangement omitted to show the manifolding and molding arrangement;

FIG. 4 is a top plan view of the apparatus with the manifold and pellet-forming means removed;

FIG. 5 is a partial end view (larger scale), partly in cross section, showing the formation and ejection of a pellet;

FIG. 6 is a transverse sectional view taken on lines 6—6 of FIG. 5, such view showing the pellet-forming portions of the apparatus;

FIG. 7 is a transverse sectional view taken on the line 7—7 of FIG. 5, such view showing the pellet-ejecting portions of the apparatus; and FIG. 8 is an elevational view, partly in vertical cross section, of a conventional pressure tank to be used as the source of semi-solid material under pressure in accordance with this invention.

Figure 1:
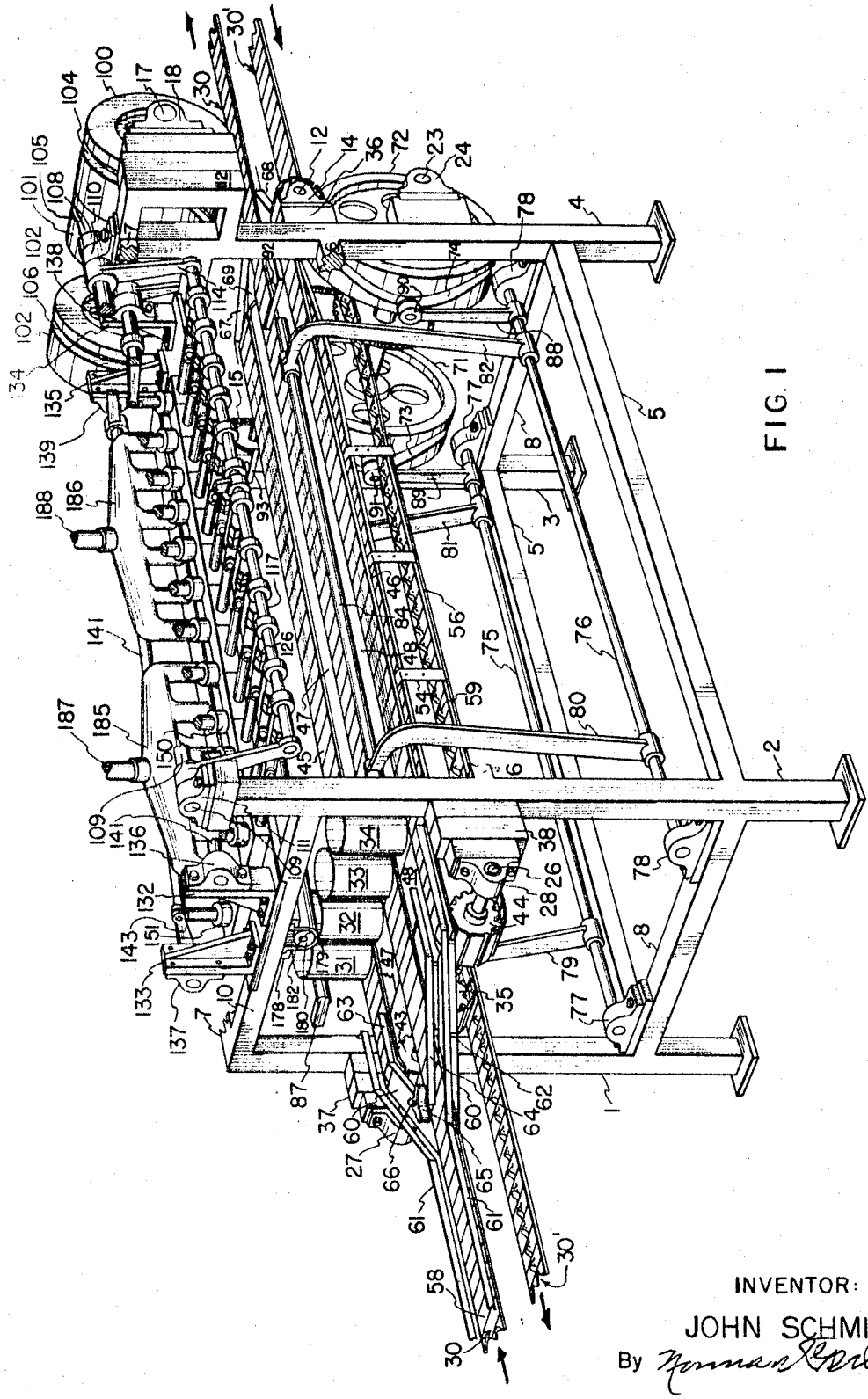
FIG. 1 is a perspective view of the apparatus embodying the invention, certain duplicate parts of the apparatus being omitted and some parts of the frame being cut away for clarity.

The following is a brief description of the embodiment of the present invention as illustrated in the accompanying drawings.

Generally speaking, the apparatus comprises a rigid supporting frame and it includes a pair of vertical frame members 1 and 2 at the front or receiving end of the apparatus, a similar pair of vertical, laterally spaced, frame members 3 and 4 at the rear or delivery end of the apparatus, and horizontal, vertically spaced, side frame members 5, 6 and 7 on the left and right sides of the apparatus. Said side frame members extend lengthwise of the apparatus and interconnect the front vertical frame members 1 and 2 and the rear vertical frame members 3 and 4. The apparatus also includes at each end portion thereof transverse end frame members 8, 9 and 10 which interconnect the vertical frame members across or transversely of the apparatus. The side members 6 and 7 of the frame are broken away in FIG. 1 of the drawings for illustrative purposes.

The conveyor and can positioning mechanism

An electric motor 11 is located at the rear end of the apparatus and it drives a horizontal shaft 12 to which is fixedly connected a sprocket 13. Such motor is suitably supported at the left-hand side of the frame as viewed in FIG. 2. The sprocket 13 drives an endless chain 15 (see FIGS. 1 to 4) and the latter, in turn, is connected to and serves to drive a sprocket 16 which is keyed or otherwise fixedly secured to an upper, horizontally extending, shaft 17. Said shaft extends transversely of the frame and has its end portions journaled in a pair of bearings 18 and 19. It is to be understood that roller, ball or solid bushing types of bearings of the oil-less or self-oiling variety may be used to support the various rotating parts of the apparatus.

The drive shaft 12 has a centrally located sprocket 20 (see FIGS. 2 and 4) keyed or otherwise secured thereto, and such sprocket serves through the medium of an endless chain 21 (see FIGS. 1, 2 and 3) to drive a sprocket 22. The latter is fixedly connected to a lower, horizontally extending, shaft 23 (see FIGS. 1, 2 and 3) which is located at the rear end of the frame, is disposed beneath and in parallel relation with the upper shaft 17, and has its end portions journaled in a pair of bearings 24. At the front of the apparatus is a horizontally extending idler shaft 26 which extends transversely of the frame and has its end portions journaled in bearings 27 and 28 at the upper portions of the vertical frame members 1 and 2. The apparatus is provided with a central, longitudinally and horizontally extending endless conveyor belt 30 the upper reach of which travels from the front of the apparatus to the rear thereof in order to supply containers, such as the cans 31, 32, 33 and 34.

The conveyor belt 30 is supported and driven by two sprockets 35 and 36 which are keyed to the shafts 26 and 12, respectively. Said conveyor belt is driven in the direction of the arrows and the return portion 30' thereof is also shown in the drawings. The shafts 12 and 26 are disposed in parallel relation and lie in a horizontal plane which is parallel to the floor on which the apparatus is mounted. Blocks or spacers 37 and 38 are provided between the shaft supporting bearings and the frame, and these may be replaced by larger spacers in order to maintain conveyor belt alignment and tension. As shown in FIG. 5, the shaft 12 has affixed thereto in spaced relationship sprockets 40 and 42, while the shaft 26 (see FIG. 1) at the front of the frame carries spaced sprockets 43 and 44 on each side of the sprocket 35. These sprockets are of the same width and diameter and carry therebetween endless conveyor belts 45 and 46 in the same plane as the endless conveyor belt 30. Stationary elongated platforms 47 and 48, having widths the same as or slightly greater than the containers to be filled, extend horizontally between the belts 46 and 30, and the belts 30 and 46, respectively, and in a plane common with the upper reaches of the conveyor belts and throughout the length of the apparatus. In order to support the platforms, longitudinally extending U beams 49 and 50 (see FIG. 2) are provided. These beams underlie the platforms and have the ends thereof connected to the cross members 9 (front and rear). Said U beams also carry longitudinal angle bar members 51 and 52 (see FIG. 2) with interconnecting supports 53 and 54 for the purpose of carrying lower longitudinal angle bar members 55 and 56. The framework of U beams, supports, and angle bar members keeps the conveyor belts 30, 45 and 46 in parallel straight-line relationship immediately adjacent to the platforms 47 and 48. The conveyor belts are preferably formed of sprocket chains of the flight type, and have series of small platforms or flat plates 58 affixed to a plurality of successive links 59 (see FIGS. 1 and 5) which are adapted to engage the various sprockets. The angle bar members engage the succession of flat plates 58 at their opposite sides in order to maintain their alignment with the sprockets and also to support the slack underneath portions of the conveyor belts as illustrated by angle bar members 56 in FIG. 1. The plates 58 are substantially wider than the links and extend outwardly therefrom in a lateral direction as shown. From this description, it is apparent that the operation of the motor 11 drives the parallel spaced apart endless belts 30, 45 and 46 in the same direction and at the same speed through the apparatus. Since some of the parts referred to are duplicated in the apparatus, reference numbers for all such parts are not shown for purposes of simplicity.

At the front end of the apparatus (see FIG. 1), a pair of platform guides 60 is provided, such guides being attached to the front ends of the U beams and extending from both sides of the central conveyor belt 30 to the side conveyor belts 45 and 46, and in the same common plane. Two spaced apart outer vertical guide rails 61 are supported by means of an upright member 62 from the guide platforms 60 and are contoured to follow adjacent the outer edges of the belt 30, the guides 60 and the belts 45 and 46. The platform guides 60 also support by means of a similar upright member an inner guide rail having bifurcated legs 63 and 64. At the juncture of the legs 63 and 64 and in the center of the endless conveyor belt 30 there is located a can deflector 65. The latter is mounted for horizontal swinging movement by way of an upright pivot pin 66.

A similar but optional arrangement of spaced guide rails 67 and 68 converging from the outside side edges of the belts 45 and 46 to the side edges of the belt 30 is provided at the rear of the apparatus. Platform guides such as indicated at 69 (see FIG. 1) can also be used. These parts are attached to the rear ends of the U beams 49 and 50 or otherwise supported by the frame and, except for the rails 67 and 68, would only be used when the machine is operated in reverse. These parts can be made interchangeable so that they can be used at either end of the apparatus and adapt same to versatile assembly line arrangements. The shaft 23 has affixed thereto a pair of spaced apart cams 71 and 72 (see FIG. 2) having cam grooves 73 and 74, respectively, on their outer circumferential surfaces. Two horizontally extending parallel but spaced apart rocker arms 75 and 76 (see FIGS. 1, 2 and 3) are rotatably supported at their ends by pairs of bearings 77 and 78 on the front and rear end frame members 8 at the bottom portion of the frame of the apparatus. Levers 79, 80, 81 and 82 are keyed to the rods 75 and 76 and have at their upper in-turned ends longitudinally and horizontally extending can pusher arms 84 and 85. The latter have, at the front ends, outwardly extending, substantially horizontal can-stopper bars 86 and 87 (see FIG. 4), the function of which will be described hereafter.

Two upstanding cam-follower arms 88 and 89 are carried by the rods 76 and 75, respectively, at the rear of the apparatus and have at their upper ends cam-followers 90 and 91 which ride in the cam grooves 74 and 73, respectively. Such cam grooves are so shaped that when the cams rotate, they cause the cam-follower arms 88 and 89 to oscillate, thereby moving the can-pusher arms 84 and 85 inwardly and outwardly a distance substantially equal to the diameter of a can or the width of the conveyor belts 45 and 46. Two horizontal fixed can-stopper arms 92 and 93 are attached to the upper portions of the rear vertical frame members 3 and 4, such arms extending over the outside belts 45 and 46 sufficiently to stop the cans thereon.

The operation of the apparatus thus far described is as follows: The upper reach of the endless conveyor belt 30 conveys empty open topped containers, i.e., the cans 31, 32, 33 and 34, between rails 61 and against the pivoted can deflector 65. The latter, in connection with back swinging movement thereof, admits the cans one after another and alternately onto the platform guides 60. When one of the cans on one of the guide platforms passes the can deflector 65, it causes the latter to swing to the opposite side with the result that the next can is deflected onto the other guide platform. When such next can passes the can deflector, it swings the deflector in the opposite direction with the result that the next following can is deflected onto said one guide platform. It will thus be seen that back and forth swinging movement of the can deflector results in every other can being deflected onto one of the guide platforms 60 and the alternate cans being deflected onto the other guide platform. The can deflector causes two lines or rows of cans to be formed and such rows of cans slide over their respective guide platforms until they come to the conveyor belts 45 and 46 which carry them therealong until the first can in each row is stopped by the arm 92 or the arm 93, as the case may be. At this time, the can pusher arms 84 and 85 are both positioned outwardly and the can 31 becomes the last can on the belt 45, while another can (not designated) becomes the last can on the belt 46. After the two rows of cans on the belts 45 and 46 are stopped, the can pusher arms 84 and 85 are caused alternately or successively to swing inwards in order to cause rows of cans to move laterally inwards into operative position with the filling mechanism that is located thereabove. The arm 84 moves inwardly through the action of the cam 74 on the cam follower 90 and resultant inward swinging movement of the levers 80 and 82, and pushes the row of cans from the belt 46 onto the platform 48, the first member can in this row being represented by the reference numeral 34 (see FIG. 1). This row of cans is now in filling position along platform 48.

Next the row of cans on the conveyor belt 45 is pushed by the can pusher arm 85 onto the platform 47 also in filling position. While the arms 84 and 85 are positioned inwardly (though not simultaneously), their respective stopper bars 86 and 87 are positioned across the two lines of incoming cans and hold such cans at rest. The arm 84 has in the meantime retracted outwards in order to allow the belt 46 to fill with cans against fixed stopper arm 92, while the cans on the platform 48 are being filled with the designated number of pellets of food material. When the arm 84 again moves inwards, the unfilled row of cans on the belt 46 are pushed off such belt and in turn pushes the filled row of cans from the platform 48 onto the central conveyor btl 30 for discharge thereby. By this time, the arm 85 has retracted and the belt 45 has been provided with a row of empty or unfilled cans. When the arm 85 again moves inwards, such row of unfilled cans moves inwards onto the platform 47 and pushes the filled row of cans on said platform onto the central belt 30 just as the last filled can from the platform 48 has passed beyond the opening between the fised can stopper arms 92 and 93. As shown in the drawings, such arms do not extend across either the platforms 47 and 48 or the belt 30. By this sequence of operations, a continuous row or line of cans can be supplied to the apparatus and removed therefrom at a rate of about 3–5 cans per second or 180–300 cans per minute, as desired. Since the cans are free to slide on the belts 45 and 46, the speed of belt travel can be equivalent to 200–250 cans per minute if desired without interfering with the operation of the apparatus.

The pellet forming and ejecting mechanism

As before indicated, the horizontal shaft 17 which is journaled in the bearings 18 and 19 is driven by the sprocket 13 through the medium of the chain 15 and the sprocket 16. This shaft has keyed thereto three generally cylindrical cams 100, 101 and 102 having circumferential cam grooves 104, 105 and 106, respectively. The cam 100 controls or actuates the mold plunger mechanism of the apparatus, while the cams 101 and 102 operate or control the pellet ejector means or mechanisms of this invention.

The mold plunger actuating mechanism comprises a substantially vertical cam-follower arm 108 the upper end of which is fixedly connected to the rear end of a longitudinally and horizontally extending rocker shaft 109. The latter is journalled at its ends in a pair of bearings 110 and 111 (see FIGS. 1, 2, 3 and 4). The bearing 110 is mounted on one end of a transversely and horizontally extending spacer block 112 the ends of which are connected to the upper ends of vertical frame members 3 and 4 at the rear end portion of the apparatus. The bearing 111 is connected to the upper end of the vertical frame member 2 at the front portion of the apparatus. In FIG. 1 of the drawings, a portion of the shaft 109 at the front portion of the apparatus has been cut away in order to show the parts lying behind same. The cam-follower arm 108 has at its lower end a cam-follower roller 113 (in FIGS. 3 and 4) which rides in the cam groove 104 in the cam 100. Such cam groove is so formed or contoured that in connection with rotation of the cam 100, it operates through the medium of the cam-follower roller 113 to oscillate or swing back and forth the cam-follower arm 108 and thereby cause rocking of the rocker shaft 9. In FIG. 5 of the drawings, the bearing 110 and the spacer block 112 have been omitted for simplicity.

The shaft 109 has affixed thereto a series of three spaced apart depending rocker arms which are designated by the reference numerals 114, 115 and 116 (see FIGS. 1 and 3) and are preferably keyed to said shaft. The lower ends of the rocker are connected to alongitudinally and horizontally extending shaft 1117. Rotation of the cam 100 causes the cam-follower roller 113 to follow in the cam-groove 104 and this, as previously pointed out, causes oscillation of the cam-follower arm 108 and the shaft 109. Such oscillation, in turn, causes the rocker arms 114, 115 and 116 to move the shaft 117 back and forth in a slight arc that is transverse of the longitudinal axis of the apparatus. This arcuate movement of the shaft 117 is translated into straight-line movement by a plurality of substantially horizontal adjustable connector links. The latter extend transversely of the apparatus and comprise outer link members 118, threaded intermediate link members 119 (see FIG. 5), and yoke-like inner link members 120. The outer end portions of the outer link members 118 are provided with transverse bores whereby they are loosely or pivotally mounted on the shaft 17. The ends of the threaded intermediate link members extend into internally threaded sockets in the adjacent ends of the outer and inner link members. The yoke-like inner link members are pivotally connected by means of horizontal pivot pins 121 to the adjacent ends of a plurality of correspondingly aligned horizontal mold plungers 122. Each threaded intermediate link member 119 has a nut 123 affixed thereto so that by loosening lock nuts 124 and 125 and turning the intermediate link member in one direction or the other, the stroke or positioning of the associated mold plunger 122 can be adjusted. Turning of the link members 119 in one direction lengthens the effective distance between the outer and inner link members 118 and 120 and turning of the intermediate link members in the opposite direction shortens the distance between the outer and inner link members. The aforementioned linkage arrangement is designated in its entirety by the reference numeral 126 in FIG. 1. Instead of such arrangement, turning buckles can be used bewveen the shaft 117 and the plunger 122.

Figure 2:
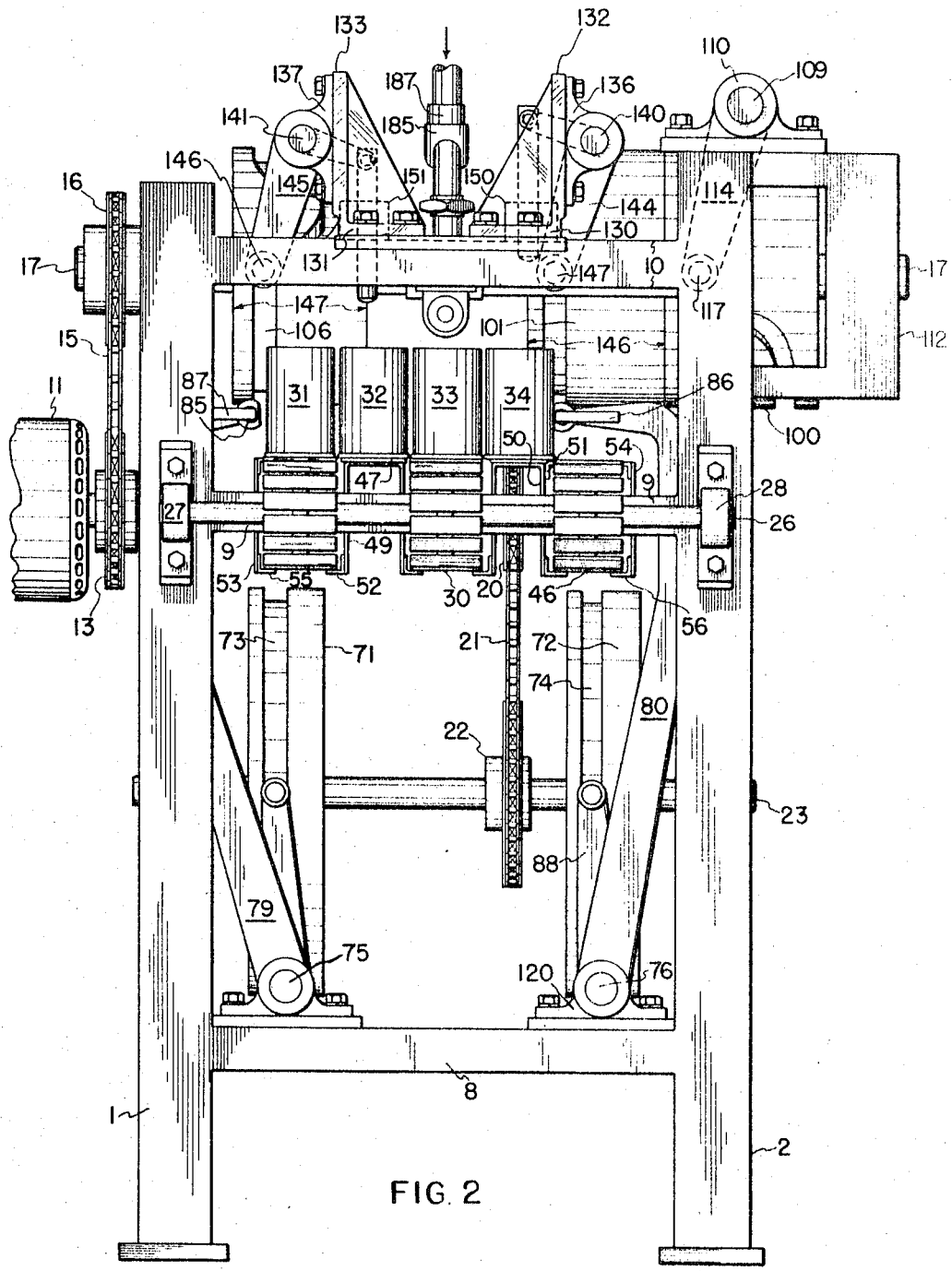
FIG. 2 is an end view of the apparatus, certain parts being shown in dotted lines in order to show their different positions during the operation thereof.

Referring to FIGS. 2 and 5 of the drawings, there is shown a pair of oppositely positioned ejector castings 130 and 131 and these extend longitudinally of the apparatus and are attached by bolts or welding to the end frame members 10. The castings 130 and 131 have at the ends thereof upright, suitably braced, supports 132 and 133, respectively. The supports 132 have mounted thereon bearings 136 and they form journals for the ends of a longitudinally and horizontally extending rocker shaft 140. The other supports, that is, the supports 133, carry aligned bearings 137 and they form journals for the end of a rocker shaft 141 which is disposed in parallel relation with and in the same horizontal plane as the rocker shaft 140. The rocker shafts 140 and 141 have keyed respectively thereto radially and substantially horizontally extending rocker arms 142 and 143. They also have keyed respectively to their rear ends depending cam follower arms 144 and 145. The latter have affixed respectively to their lower ends cam-follower rollers 146 and 147 and these are respectively engaged in the cams 101 and 102 which are driven by the operating shaft 17. Rotation of the cams 101 and 102 operate through the medium of the cam-follower rollers 146 and 147 and the cam-follower arms 144 and 145 to rock the rocker shafts 140 and 141 and the latter, in turn, operate through the rocker arms 142 and 143 to reciprocate the ejector rods 154 and 155.

The two oppositely disposed or side-by-side ejector castings 130 and 131 embody respectively longitudinal series of upstanding, spaced apart, ejector guides 150 and 151 (see FIG. 5 in particular) having vertical cylindrical bores 152. A longitudinal series of vertical and cylindrical ejector rods 154 is slidably mounted in the bores 152 of the guides 150 and a similar series of vertical ejector rods 155 is slidably mounted in the bores 152 in the ejector guides 151 of the ejector casting 131. The two ejector castings 130 and 131 are preferably formed as single elongated units with longitudinal reinforcing webs or walls between their respective upstanding ejector guides. As illustrated in FIGS. 5 and 7, the upper end of each ejector rod is flattened to form a narrow upstanding ear 156 and the latter has an elongated hole or slot 157 therein to accommodate the central portion of a transverse pivot pin 158. The ends of the pivot pins 158 are fixedly mounted in the bifurcated distal ends of the rocker arms 142 and 143. Thus, the arcuate motion of the rocker arms 142 and 143 is translated into straight-line vertical movement of their respective ejector rods 154 and 155 through the sliding motion of the transverse pins 158 in the slots 157.

The two rows of parallel ejector rods 154 and 155 operating in the two series of spaced apart ejector guides 150 and 151 are thus moved up and down in timed relationship to each other as governed by the cam grooves 105 and 106 in the cams 100 and 101. These two cam grooves are so contoured that the two series of ejector rods are moved up and down in alternate or opposite relation or in opposite phases of the operation cycle of the apparatus, and in timed relation to the horizontal reciprocation of the mold plungers 122. The latter reciprocate within the horizontal bores 159 in a longitudinal series of transversely and horizontally extending mold blocks 160.

As shown in FIG. 6, each mold block 160 comprises two matching or complemental upper and lower halves 161 and 162, and these are held together and also connected to the lower portions of the ejector castings by means of vertical bolts 163. The horizontal mold plungers 122 are slidably mounted within the mold halves in close fitting relationship. In cross section, both the mold plungers 122 and the bores 159 are generally or substantially elliptical and each has upper and lower curved or arcuate surfaces, each of which is less than half of a circle in order that the horizontal cross-sectional dimension of each mold plunger and each bore is slightly greater than the vertical dimension thereof and yet so that each of the two opposed upper and lower curved surfaces is a segment of a circle. All mold surfaces of the mold plungers and the mold blocks are machined to smooth curved surfaces in order to form pellets which are truly ball-like and free of projections.

Each mold plunger 122 has two vertically extending cylindrical mold cavities 164 formed therein and they are disposed and spaced horizontally along the plunger a distance equal to or just slightly greater than one can-diameter. Each of the upper halves 161 of the mold blocks is provided in its central portion with an upwardly facing supply-inlet opening or port 165 and it is spaced about one can-diameter from and in line with the bores 152 of the associated ejector guides. Each of the lower halves 162 of the mold blocks 160 is provided beneath the port 165 with a downwardly facing bleeder or return hole 166 and it is frustoconical in shape and arranged so that its constricted end is in communication with the associated bore 159 and its wider and opened end is directed downwardly.

As shown in FIG. 7, each upper mold block half 161 has a pair of vertical and cylindrical ejector passageways 167, and each lower mold block half 162 has a like pair of coaxial vertical and cylindrical ejector passageways 168. These pairs of vertical passageways are directly beneath, in vertical alignment with, and of the same diameter as, the bores 152 in the ejector guides 150 and 151. This construction allows each ejector rod on its downward stroke to pass first through the associated passageway 167, then through the associated mold cavity 164, and finally into the associated passageway 168 in the lower mold block half 162 far enough to eject the semi-solid food material from the mold cavity.

The portions of the lower mold block halves 162 that define or are located adjacent to the lower end portions of the ejector passageways 168 are cut away (see FIG. 7) to form generally cylindrical or curvilinear surfaces 169 of the same or substantially the same radius as the radii of the two cylindrical plunger guiding surfaces of the bores 159 thereabove. The axes of said surfaces 169 are parallel with the bores 159 but are disposed a small distance therebelow.

The lower ends of the ejector rods 154 and 155 are also cut away to form similar generally cylindrical or curvilinear surfaces 170 and these correspond to and are shaped conformably to the surfaces 169 and the upper and lower surfaces of the bores 159 to the end that when the bottom surfaces of the ejector rods 154 and 155 come into contact with the pellets of semi-solid material within the mold cavities 164 in the mold plungers 122 there will be no distortion of the pellets due to the fact all the adjacent or abutting surfaces match.

The ejector rods 154 and 155 move downwardly to a point where their lower end surfaces 170 are slightly beyond or below the surfaces 169 (by about ⅛ inch more or less). With the lower end portions of the passageways having associated with them the curved or arcuate surfaces 169, the side-contact area between the mold surfaces and the pellets or meat-balls is reduced and is broken at or about the same time throughout the horizontal circumference of the pellets or meat-balls, thus avoiding or mitigating distortion of the latter's outer shape. The distance between the vertcal axes of each pair of opposed ejector rods 154 and 155 is generally equal to or slightly greater than two can-diameters, so that there is sufficient space to accommodate the row of filled cans on the belt 30.

Referring to FIG. 7, an annular air-distributing channel or groove 175 is formed in the cylindrical outer surface of each ejector rod 154 and 155. Longitudinal holes 176 extend upwards from the lower end surface 170 of each ejector rod and communicate with the aforementioned groove 175. At the base portion of each ejector guide 150 and 151 there is provided a horizontal conduit 177, the orifice of which communicates with the bore 152 therein. Such conduits are located so as to register with the aforementioned annular grooves 175 on the down stroke of the ejector rods 154 and 155 just as the pellets have broken from or are about to break contact with the lower end zones of the ejector passageways 168. A source of compressed fluid, preferably an inert gas or air at a relatively low pressure of 2 to 8 p.s.i., is supplied to the conduits 177. As each ejector rod reaches the end of its downward stroke after passing through the associated mold cavity 164 of the associated mold plunger, the groove 175 in the rod registers with the associated conduit 177 and the compressed air that it receives from the conduit passes or flows downwards through the holes 176 and against the pellet in said associated mold cavity and thus breaks any adhesion between the pellet and the lower end surface 170 of the rod.

A pair of spaced apart parallel angle bar type supports 178 and 179 is affixed to the underneath portions of the mold blocks 160 and also to uppermost frame and cross members 10, as shown in FIGS. 1 and 5, and such supports engage laterally and outwardly extending ears of the upper side portions of a longitudinally and horizontally extending U-shaped trough 180. The latter houses an elongated screw-conveyor 181 which is connected to and driven from a rotatable shaft 182. The trough 180 is positioned directly under the series of spaced apart bleeder holes 166 in the lower halves 162 of the mold blocks. The screw conveyor 181 may be operated in either direction and means, not shown, are provided at its exit or discharge end to catch over-flow semi-solid food material coming from the bleeder holes 166 for recycle through the compression and manifold system of the apparatus. By way of this means, there is little or no waste experienced.

The series of inlet ports 165 in the central portions of the upper halves 161 of the mold blocks 160 are connected to and communicate with the lower ends of a longitudinal series of upstanding conduits 183 (see FIG. 3). The upper ends of said conduits are connected by unions 184 to the depending discharge branches of a pair of manifolds 185 and 186 (see FIGS. 1 and 2). Said manifolds are connected, respectively, by supply conduits 187 and 188 to a source of pressurized amorphous semi-solid food material, such source being represented by or comprising a cylindrical supply tank or reservoir 190 (see FIG. 8). Any suitable means for supplying semi-solid food material under pressure to the apparatus of this invention may, of course, be used, such means including a pump, an elevated supply tank, or a reservoir with self-contained pressure means as illustrated. The reservoir 190 has a laterally extending outlet conduit 191, and it is connected to the supply conduits 187 and 188. The reservoir also has a removable cover member 192, together with means such as clamps 193 for attaching the cover member in pressure-tight relationship with the open top of the reservoir. The supply of semi-solid food material in the reservoir 190 is represented by the reference numeral 194 and such supply surmounts a vertically movable bottom or follower 195. An air suply line 196 is controlled by a valve 197 and leads to the bottom of the reservoir 190. The follower 195 has a circumferential gasket 198 to maintain sealed relationship with the side wall of the reservoir. Air or other fluid under pressure is supplied by the line 196 against the underneath side of the follower 195 thereby forcing the semi-solid food material 194 out through the conduit 191 to the manifolds 185 and 186. For this purpose, air pressure of about 100 to 150 p.s.i. is sufficient.

Operation of the apparatus

Assuming, as before described, that a continuous supply of cans is being conveyed to the apparatus via the conveyor belt 30 and four lines or rows of cans (represented by the cam 31 on the belt 45, the can 32 on the platform 47, the can 33 on the belt 30, and the can 34 on the platform 48) are in the apparatus and that a continuous supply of ground meat or other semi-solid food material under pressure is being conveyed or forced into manifolds 185 and 186 from the reservoir 190, the operation of the apparatus is as follows:

The ground meat is forced continuously into the inlet ports 165 of the mold blocks 160. Each time the mold plungers move in one direction or the other so that their mold cavities 164 register with the inlet ports, the cavities are filled with meat, and each time a filled cavity moves into a position to register with its associated ejector rod, the meat, in connection with the down-stroke of the rod, is ejected as a pellet or ball. Any excess meat squeeze downwards through the bleeder holes 166 and is conveyed away by the screw-conveyor 181 and then returned to the reservoir 190. The can rows 32 and 34 are being alternately or successively filled with the designated number of meat balls as indicated at 200. The can pusher arm 84 retracts, allowing the belt 46 to begin to fill with a new row of cans 201 (see FIG. 5), and at the same time the row of filled cans 33 has been conveyed from the apparatus by the belt 30. As the last meat balls are dropped into the row of cans 32, the can pusher arm 85 moves inwardly and row of unfilled cans 31 pushes the row of filled cans 32 onto the belt 30 to the end that it begins its trip out the discharge end of the apparatus. The row of cans 31, now on the platform 47, begins the filling cycle and the row of cans 34 receives the last series of meat balls. The row of cans 201 is now complete and the arm 84 moves inwardly against row of cans 201 and push the row of cans 34 onto the belt 30, while at the same time the arm 85 has retracted to enable the belt 45 to receive a new row of empty cans.

It is obvious that the speed and drive ratios between the upper cams 100, 101 and 102 and the lower cams 73 and 74 is such that for every revolution of the lower cams, the upper cams will rotate a sufficient number of revolutions to effect molding and ejection of the desired number of meat balls into the cans being filled. The offsets in the cam grooves are gradual so that the operation of the apparatus is smooth and free of vibration. These grooves are preferably formed so that the motions that they impart to the various cam followers move the rocker shafts so that they accelerate slowly to a peak of motion and slow down at the end of each directional cycle.

The apparatus of this invention is adjustable to any desired speed of operation, that is, the rate of travel of the cans into and out of the apparatus can be varied as desired or the number of pellets per can is subject to variation and accurate control. As an example, the apparatus can be adjusted to feed 6 meat balls to a can and be capable of filling from 100 to 300 or as high as 350 cans per minute. Even at these speeds, the apparatus requires little supervision. There is also a great saving in floor space over hand-filling techniques. Normally, the present apparatus will be operated at a rate of about 250 to 300 cans per minute with about 4 to 10 pellets of semi-solid food material (ground meat) per can. By increasing the number of ganged mold blocks and mold plungers in a single apparatus, the number of cans per minute can be increased above these figures, such figures being merely illustrative.

From the foregoing description, it is apparent that the apparatus of this invention has several features. The apparatus is constructed so that changes in gear ratios and relative speeds of cam rotation and conveyor belt travel are readily made or coordinated. Although the invention can be used with a single mold block, a single ejector rod and a single mold plunger having a single mold cavity operating as a single unit or with similar units to form a gange of such single units in sequence, it is preferred for speed of operation to use a gang of double mold plungers in sequence as illustrated in the drawings. This feature coupled with the ganging of incoming empty containers, the multiple and alternate filling and the multiple and alternate conveyance of filled containers from the apparatus comprises another important feature of this invention.

Also the use of a fluid under pressure to aid in the ejection of each pellet allows increased speed of operation and more uniformity in the finished product. The fluid used for this purpose in the conduits 177 can be compressed air, as described, or other inert gas or can be a liquid, such, for example, as a sauce or gravy, contemplated as part of the formula to be packaged and incorporated with the pellets in the cans. This fluid acts as a lubricant and prevents the pellets from sticking to the metal parts. Vegetable or animal oil can be used for this purpose.

Any materials of ordinary construction can be used to fabricate the apparatus of this invention. Preferably the stationary and moving parts which contact the semi-solid food material to be pelleted are made of the better grades of steel and may, in some instances, be made of stainless steel or the like.

It is also apparent that the parts are easily dismantled for inspection, cleaning or adjustment. The apparatus also accommodates different widths of conveyor belts, stationary filling platforms and cams for suitable adjustment to containers that vary in diameter. The distance between the tops of the containers and the bottoms of the mold blocks can also be varied as desired. Since the pellets that are formed are curvilinear, being approximately spherical or speroidal in shape, they pack readily in a cylindrical can or a rectangular container. Also no spacers are used and the cans themselves provide automatic spacing in both directions through the apparatus. This adds to the accuracy of placement of pellets and the smoothness of over-all operation.

Having thus described the invention what I claim as new and desire to secure by letters patent is:

1. An apparatus for forming pellets of semi-solid material comprising, in combination:
   (1) a mold housing (block 160) having a longitudinal bore therethrough;
   (2) a supply port in one side of said mold housing communicating with said bore;
   (3) an ejector passageway through said mold housing communicating with said bore and spaced from said supply port;
   (4) an ejector plunger (rod 154 or 155) slidably mounted in said ejector passageway;
   (5) a mold plunger slidably mounted in said bore;
   (6) a mold cavity extending through said mold plunger and having its axis in the common plane of the axes of said supply port and said ejector passageway, the cross-sectional configurations of said mold cavity and said ejector passageway being substantially the same with the transverse axis of the former being less than the transverse axes of the latter;
   (7) means to reciprocate said mold plunger within said bore so that said mold cavity registers with said supply port and said ejector passageway in sequence; and
   (8) means to reciprocate said ejector plunger through said ejector passageway and through said mold cavity during the sequence of registry therewith, said reciprocating means being adapted to cause said mold cavity to dwell at said points of registry with said supply port and said ejector passageway.

2. An apparatus in accordance with claim 1 and in which said mold housing has a bleeder port in the side opposite said supply port and registrable with said mold cavity simultaneously with the said supply port.

3. An apparatus in accordance with claim 1 and including, additionally, means in juxtaposition with said bleeder port to remove effluent therefrom.

4. An apparatus in accordance with claim 1 and in which a source of semi-solid material under pressure is in communication with supply port.

5. An apparatus in accordance with claim 1 in which said mold housing has:
(9) a second ejector passageway therethrough in the same side and axial plane as said first ejector passageway and spaced from said supply port on the opposite side thereof;
(10) a second ejector plunger slidably mounted in said second ejector passageway;
(11) a second mold cavity in said mold plunger having its axis in the common plane and in spaced relationship with the axes of said supply port and said first ejector passageway, the cross-sectional configuration of said second mold cavity and said second ejector being substantially the same;
(12) whereby said reciprocation means moves said mold plunger and said second mold cavity into registration with said supply port and said second ejector passageway in sequence; and
(13) means to reciprocate said second ejector plunger through said second ejector passageway and through said second mold cavity during the sequence of registry therewith.

6. An apparatus in accordance with claim 5 and in which said mold housing has a bleeder port in the side opposite said supply port and registrable with said first and second mold cavities in sequence as same register with said supply port.

7. An apparatus in accordance with claim 6 and including, additionally, means in juxtaposition with said bleeder port to remove effluent therefrom.

8. An apparatus in accordance with claim 5 and in which a source of semi-solid material under pressure is in communication with said supply port.

9. An apparatus in accordance with claim 1 and in which said ejector plunger has a circumferential groove in its outer surface and spaced from the ends thereof, at least one longitudinal bore in said ejector plunger extending in communication with said circumferential groove to the end thereof registering with said mold cavity, an orifice in said ejector passageway in communication with said groove at the bottom point of reciprocation of said ejector plunger and a source of fluid pressure connected to said orifice.

10. An apparatus in accordance with claim 1 and in which said longitudinal bore in said mold housing is uniformly curvilinear in cross section, the effective diameter of said mold cavity is less than the diameter of said bore, and the end of said ejector plunger passing therethrough has a corresponding curvilinear transverse concavity therein.

11. An apparatus in accordance with claim 1 and in which said mold housing comprises upper and lower halves defining said bore, said ejector passageway extends through said mold halves, and the peripheral lower edge of said ejector passageway is concave.

12. An apparatus in accordance with claim 1 and in which a plurality of said mold housing with associated bores, supply ports, ejector passageways, ejector plungers and mold plungers with associated mold cavities are arranged in succession, and said mold plungers and said ejector plungers are separately reciprocated in unison by their respective reciprocation means in their sequence of registry.

13. An apparatus in accordance with claim 5 and in which a plurality of said mold housing with associated bores, supply ports and pairs of ejector passageways and associated pairs of ejector plungers and mold plungers with associated mold cavities are arranged in succession, and said mold plungers are separately reciprocated in unison by said reciprocation means while the plurality of first ejector plungers and the plurality of second ejector plungers are separately reciprocated in unison in their sequences of registry.

14. An apparatus in accordance with claim 12 and including a succession of said mold housing arranged in a substantially horizontal plane, the ejector plungers and supply ports of which are spaced one container diameter from each other, stationary container support means longitudinally disposed beneath said successive ejector passageways, and means to move successive groups of open-topped containers onto said stationary platform beneath and corresponding to said ejector passageways.

15. An apparatus in accordance with claim 13 and including, additionally, a central horizontal belt conveyor means extending below and transverse to said succession of mold housings in substantial alignment with said supply ports and between said stationary platforms, a horizontal belt conveyor means on the outer side of each stationary platform, said conveyor means having substantially plane upper container-carrying surfaces in a common plane, said conveyor means adapted to carry rows of contiguous containers from the front end of said apparatus to the rear thereof, means to divert alternate rows of containers from said central conveyor means to said side conveyor means, container stop means at the rear ends of each of said side conveyor means, means to alternately move a succession of open-topped containers in unison from said side conveyor means onto said stationary conveyor means, said side and central conveyor means and said stationary conveyor means having widths substantially the same as said containers whereby the movement of a succession of containers from said side conveyor means to each of said stationary platforms brings the moving containers into contact with the succession of containers thereon and same are moved, alternately in time sequence to said central conveyor means for discharge from the apparatus.

16. An apparatus in accordance with claim 15 and in which said means to move successive rows of containers from said side conveyor means comprises a pair of bars extending from said stop means to the first of said mold housings the longitudinal axis of which is located less than a container height above each of said side conveyor means, cam stop means extending from the front end of each of said bars and means to alternately reciprocate said bars transverse the longitudinal axes of said side conveyor means a distance substantially equal to the diameter of said containers.

17. An apparatus in accordance with claim 15 and in which said reciprocation means for said ejector plungers, mold plungers and longitudinal bars comprise rotatable cams, cam-follower arms affixed to rotatable shafts and having cam rollers in operable relationship with cam grooves, therein, rocker arms affixed to a pair of said shafts and pivotally connected to each of said successive ejector plungers, a pivot shaft extending from one of said cam-follower arms, pivotal link means connected between said pivot shaft and each of said mold plungers, a pair of said cam-follower arms being individually connected to longitudinal spaced rocker rods, rocker arms extending from and affixed to said rocker rods and attached to said bars, said cams being adapted to reciprocate said mold plungers within said mold housings and said ejector plungers therethrough and also reciprocate said bars such that each of said mold cavities registers with its associated supply port and said ejector port at least once with each reciprocation of each of said bars.

18. In a pellet-forming apparatus the combination of
(1) a row of horizontal elongated mold housings, each having a longitudinal bore therethrough, said bores being curvilinear in cross section and disposed centrally of the top and bottom of each of said housings,
(2) a row of supply ports through the top side and intermediate the ends of each of said mold housings and communicating with the respective bores therein,
(3) a pair of vertical generally cylindrical ejector passageways extending through the top and bottom of each of said mold housings, said ejector passageways being equally spaced on each side of the respective supply ports and in the plane of the axes of said longitudinal bores and the axes of said supply ports, said ejector passageways having diameters less than the diameters of said curvilinear bores, in a plane perpendicular to the axes of said ejector passageways, and having concave bottom peripheral edges,
(4) ejector guides in axial alignment with the top portions of each of said ejector passageways,
(5) ejector plungers slidably mounted with each of said ejector guides,
(6) mold plungers slidably mounted in each of said longitudinal bores of said housings,
(7) a pair of substantially cylindrical mold cavities extending through each of said mold plungers, said mold cavities having their axes in the plane of the horizontal axis of said bores and in the plane of the vertical ejector passageways and ejector guides, and having curvilinear cross sections corresponding to the cross sections of said ejector plungers,
(8) a rotatable shaft extending transverse said row of mold housings in the plane of said bores,
(9) cams affixed to and rotatable with said shaft, said cams having individual circumferential and longitudinally spaced cam grooves therealong,
(10) a pair of parallel rocker shafts extending transverse and spaced from said row of mold housings, each within the effective plane of one of said cam grooves,
(11) a cam follower arm affixed at one end to each of said rocker shafts,
(12) cam followers on the extended ends of said cam follower arms in operable sliding relationship within said cam grooves,
(13) a rocker arm affixed to each of said shafts at one end thereof, and connected to,
(14) a pin mounted in the upper end of each said ejector plungers within a slot therein,
(15) a plunger actuating shaft extending substantially parallel to and spaced from said rocker shafts,
(16) a cam follower arm affixed at one end to said plunger actuating shaft with a cam follower thereon in operable sliding relationship with one of said cam grooves,
(17) rocker arms affixed at one of their ends to said plunger actuating shaft and at their other ends to each of said plungers,
(18) said grooves having offsets therein to alternately reciprocate said ejector plungers and said mold plungers in unison,
(19) means to supply a semi-solid material under pressure to said supply ports,
(20) means to convey a row of contiguous open-topped containers to said apparatus,
(21) means to alternately divide said containers into two parallel spaced rows extending outside the line of said ejector passageways,
(22) stationary filling platforms under and in line with said ejector passageways,
(23) means to convey said containers from said apparatus located centrally between said filling platforms, and
(24) means alternately to move said containers from said parallel spaced rows onto said stationary filling platforms while at the same time moving said rows of containers against rows of containers already on said filling platforms to move same from said filling platforms alternately onto said central conveyor means.

19. An apparatus adapted to form pellets of semi-solid material and deposit them into open-topped containers and comprising: a pressurized source of the material, a mold block having a horizontal bore with an upwardly facing inlet opening connected to said source and a downwardly facing discharge opening longitudinally displaced from the inlet opening and within the longitudinal confines of the bore, a horizontal mold plunger having a vertical transverse passage therethrough establishing an open-ended mold cavity, said plunger being reciprocable in said bore in close fitting relation between a first position wherein the upper end of the cavity registers with the upwardly facing inlet opening and a second position wherein the lower end of the cavity registers with said downwardly facing outlet opening, means for reciprocating said plunger between said first and second positions so that pressurized charges of the material entering the cavity through the inlet opening are sheared by the edges of the inlet opening from the source and are thus shaped to pellet form and conducted to a position of register with the discharge opening and above the same, said bore having a clearance opening in vertical alignment with the discharge opening and directly above the latter, a vertically reciprocable ejection plunger in alignment with said vertically aligned openings, and means automatically effective when the mold plunger is in its second position for reciprocating said ejection plunger to project the same downwardly through said aligned openings and mold cavity to discharge the formed pellet in the latter through the discharge opening, and means for conveying open-top containers successively and individually to a filling position directly beneath said downwardly facing discharge opening in timed relation to the movements of said plungers for reception therein of the discharged pellets and for maintaining each thus conveyed container in said filling position during a predetermined number of strokes of the plungers whereby a predetermined quota of pellets will be discharged into each container.

20. An apparatus as set forth in claim 19 and wherein said bore and vertical transverse passage are cylindrical, and said ejection plunger is provided with a concave lower end engageable with the pellets, whereby the ejected pellets are shaped generally to rounded ball-like configuration.

References Cited

UNITED STATES PATENTS

| | | | |
|---|---|---|---|
| 744,048 | 11/1903 | Cerruti | 141—170 |
| 1,218,416 | 3/1917 | Krarup | 141—12 |
| 2,814,921 | 12/1957 | Beerend | 53—122 |
| 3,122,869 | 3/1964 | Miller | 53—122 |
| 3,186,140 | 6/1965 | Bogdanovich | 53—24 X |
| 3,290,859 | 12/1966 | Talbot | 53—250 X |

WAYNE A. MORSE, Jr., Primary Examiner

U.S. Cl. X.R.

53—124, 250; 17—32; 99—187; 141—170